United States Patent Office.

HECTOR DE GROUSILLIERS, OF POTSDAM, PRUSSIA, GERMANY.

PROCESS OF TREATING SLUDGE ACID.

SPECIFICATION forming part of Letters Patent No. 378,774, dated February 28, 1888.

Application filed September 6, 1887. Serial No. 248,971. (No specimens.)

*To all whom it may concern:*

Be it known that I, HECTOR DE GROUSILLIERS, of the town of Potsdam, in the Kingdom of Prussia and German Empire, have invented a certain new and useful process of manufacture, consisting of the separating out or removal of the impurities contained in the spent or waste sulphuric acid resulting from the processes used in the petroleum, paraffine, and tar industries, and of which I declare the following to be a correct specification.

This invention relates to a new process of manufacture, consisting of the separating out or removal of the impurities contained in the spent or waste sulphuric acid resulting from the processes used in the petroleum, paraffine, and tar industries, by forming a bisulphate of soda or potash from the said acid and the evaporation of the bisulphate to such concentration that the impurities will float on the surface of the fluid in the form of tar.

The sulphuric acid used in the petroleum and tar industries for purifying the various products forms a worthless waste product, although a considerable amount of sulphuric acid still remains in the same. The process described later on in this specification renders it possible to regenerate this waste or spent sulphuric acid, or to employ this said waste sulphuric acid instead of pure acid for manufacturing certain chemical products.

The spent sulphuric acid can be diluted, in the usual manner, with about the like volume of water, whereby the greater part of the impure matter is made to float on the surface of the fluid in the form of a tarry substance, which can subsequently be removed, although this dilution with water can be omitted. The spent or waste acid is then led into a deep leaden-lined iron trough or vessel, which at its lowest part has a waste-pipe, and through the addition of sulphate of soda or potash in the requisite quantity bisulphate can be produced. Hereupon the fluid is brought to boiling temperature and then evaporated. The bisulphate is after a short time precipitated, while the waste or unclean matter will float on the surface. The bisulphate is then led off and introduced into an open-hearth furnace with cast-iron bed, and the above-mentioned sulphate then deprived of its aqueous substance by means of heating it to a moderate red heat. Care must be taken that the products of combustion produced in this heating operation are mixed with a surplus of air, so as to consume any impure matter still contained in the said bisulphate. As soon as this is effected and the bisulphate has been sufficiently deprived of its aqueous contents, it is removed and used at the option of the manufacturer. In order to obtain the sulphuric acid contained in the bisulphate, the same is led or brought into an open-hearth furnace, reverberating or other suitable furnace, which is connected with a condenser on the Glover system, and is then heated to red heat, whereby the sulphuric acid escapes in the form of vapor. The products of combustion mixed with sulphuric acid flow into the condensing-tower, down which a current of cold water in spray form descends to condense and absorb the said gases. The quantity of the descending water employed should be such as to allow the sulphuric acid to escape at the bottom of the tower in concentrated form, about 60° Baumé. I consider it preferable to add one equivalent of sulphate of magnesia or such other metallic sulphate or sulphates, which, when mixed with seven equivalents of water, will form vitriol, to the sulphate of soda or potash mixed with the waste acid. The removal of the impurities, as well as the development of the acid-vapors, is more readily accomplished in the open-hearth or other suitable furnace.

In order to form a bisulphate, chlorate of soda or chlorate of potash can be added to the waste acid instead of the sulphate of the same. The advantage gained is that hydrochloric acid is obtained. The heating is in this case effected in a closed vessel or a cast iron retort, which is so arranged as to lead the hydrochloric acid into a condenser for condensing and obtaining the same. As soon as the bisulphate is formed, the impurities are separated out and float on the surface, so that the bisulphate can be drawn off in a pure state and used at discretion. I have found it preferable to mix the said bisulphate with chlorate of soda or chlorate of potash, and produce in the well-known manner the respective bisulphates for treating the said material.

Having now described my said invention and in what manner the same is to be performed, I declare that what I claim is—

1. The hereinbefore-described process of recovering sulphuric acid, consisting in first removing the petroleum or tarry impurities by floating said impurities, then adding to the waste recovered thereby sulphate of soda or potash, and precipitating the bisulphate formed therefrom by boiling and evaporation, then depriving the precipitate of its aqueous substance by heat, and finally in vaporizing and condensing the sulphuric acid therein, all substantially as described.

2. The hereinbefore-described process, consisting in adding to the waste containing sulphuric acid sulphate of soda or potash, then precipitating the bisulphate obtained therefrom by boiling and evaporation, and finally depriving the precipitate of its aqueous substance by heat in a furnace, all substantially as described.

In witness whereof I have hereunto set my hand in the presence of two subscribing witnesses.

HECTOR DE GROUSILLIERS.

Witnesses:
 B. ROI,
 ANTHONY STEFFEN.